Nov. 6, 1923. 1,473,479
T. HUNTER
AUTOMOBILE LICENSE PLATE
Filed Aug. 12, 1921
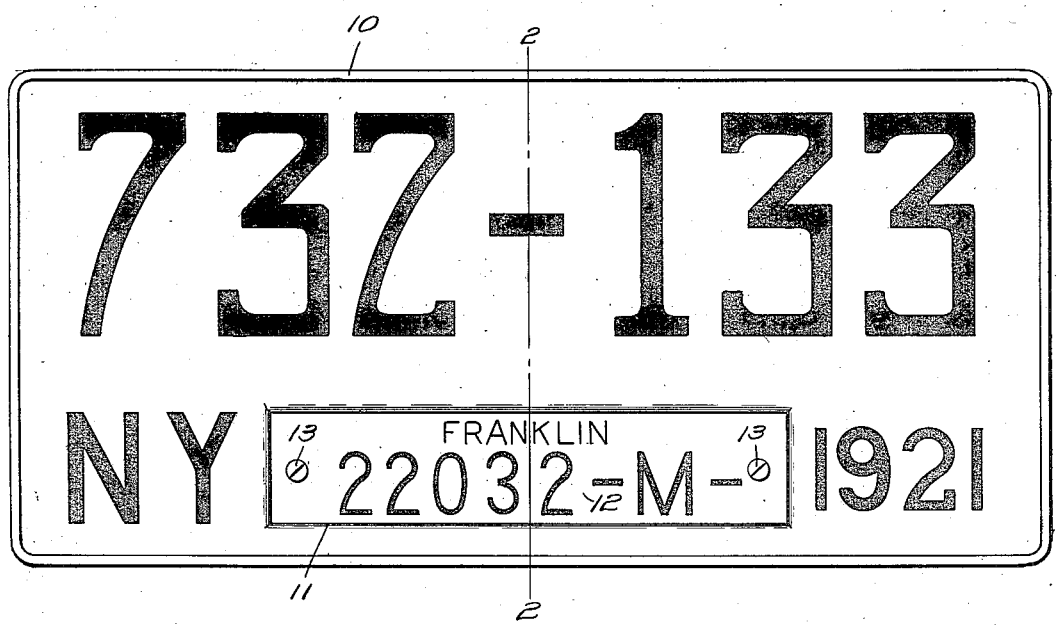
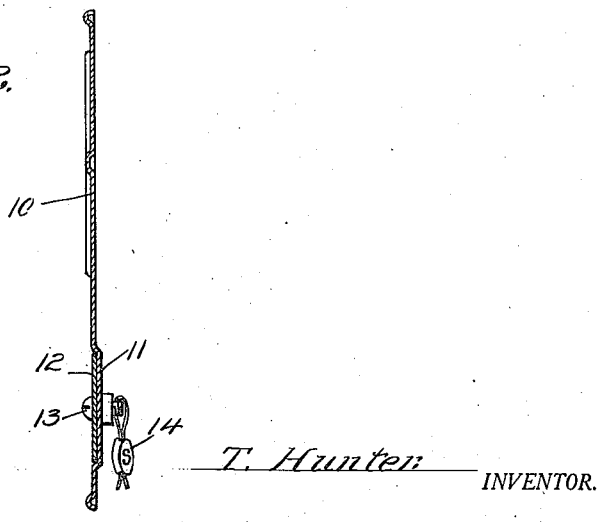
T. Hunter INVENTOR.
BY Geo. F. Kimmel ATTORNEY.

Patented Nov. 6, 1923.

1,473,479

UNITED STATES PATENT OFFICE.

THOMAS HUNTER, OF ALBANY, NEW YORK.

AUTOMOBILE LICENSE PLATE.

Application filed August 12, 1921. Serial No. 491,857.

*To all whom it may concern:*

Be it known that I, THOMAS HUNTER, a citizen of the United States, residing at Albany, in the county of Albany and State of New York, have invented certain new and useful Improvements in Automobile License Plates, of which the following is a specification.

This invention relates more particularly to the license tags employed upon motor driven vehicles, and has for one of its objects to provide a simply constructed device comprising the salient features of an ordinary tag containing the designating number of the license issued by the State or other community, together with a detachable auxiliary plate bearing data to designate the manufacturer's identifying number or the like, and generally corresponding to the usual identifying data impressed upon the engine bed or other part, the auxiliary plate being "sealed" or otherwise connected to the license plate to prevent surreptitious removal.

With this and other objects in view the invention consists in certain novel features of construction as hereafter shown and described and then specifically pointed out in the claim, and in the drawings illustrative of the preferred embodiment of the invention;—

Figure 1 is an elevation of the improved tag,

Figure 2 is a section on the line 2—2 of Figure 1.

The manufacturers of auto driven vehicles impress upon their vehicles designating characters, generally numbers in consecutive order, at some point not readily observed, for instance upon some portion of the engine bed, while the license granting authorities require that the license number, the State or other community issuing, together with the year in which the license is granted, be displayed both front and rear and illuminated at night. To protect the owners of such vehicles from theft and to readily identify the vehicle, is the principal object of the present invention, which consists in forming the usual license tag, one of which is represented as a whole at 10, and which is usually pressed up from sheet metal, with a depressed or sunken portion, indicated at 11.

Fitting closely within the sunken portion is an auxiliary plate 12. Formed through the auxiliary plate 12 and lengthwise through the bottom of the depression 11 in the main tag, are registering apertures to receive headed pins or bolts 13, to hold the auxiliary plate in position. The inner ends of the pins are adapted to receive a "sealing" means, indicated conventionally at 14, to prevent surreptitious removal or tampering with the auxiliary tag.

The main tag member 10 is to bear the usual data such as the license number, the State by whose authority the license is issued, together with the year for which the license is granted, while the auxiliary plate 11 will generally bear the same identifying data which is placed by the manufacturer upon the vehicle, for instance on the engine bed, together with the name of the vehicle, if desired.

The auxiliary plate 12 being "sealed" in position, cannot be detached by unauthorized persons, hence the vehicle is protected from thieves, and if stolen its detection is rendered certain and easy.

The preferred embodiment of the invention is disclosed in the drawings and set forth in the specification, but it will be understood that modifications within the scope of the claim may be made in the construction without departing from the principle of the invention or sacrificing any of its advantages.

Having thus described the invention what is claimed as new is:—

A device of the class described comprising a body plate having a depressed portion with apertures through the body within the depression, an auxiliary plate fitting within the depression with its outer face flush with the outer face of the body and provided with apertures registering with the apertures in the depression, bolts extending through said registering apertures and each provided with a head at one end and with a nut bearing against the inner face of the body plate, each of said bolts having a transverse aperture in advance of the nut thereof, and seal devices inserted through said apertures.

In testimony whereof I affix my signature hereto.

THOMAS HUNTER.